(12) United States Patent
Xiang et al.

(10) Patent No.: US 10,989,860 B2
(45) Date of Patent: Apr. 27, 2021

(54) BACKLIGHT MODULE AND DISPLAY DEVICE

(71) Applicants: Beijing BOE Optoelectronics Technology Co., Ltd., Beijing (CN); BOE TECHNOLOGY GROUP CO., LTD., Beijing (CN)

(72) Inventors: Desheng Xiang, Beijing (CN); Yanming Wang, Beijing (CN); Jiaqiang Wang, Beijing (CN); Cheng Chang, Beijing (CN); Rui Liu, Beijing (CN); Shuainan Liu, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 330 days.

(21) Appl. No.: 16/099,983

(22) PCT Filed: Apr. 20, 2018

(86) PCT No.: PCT/CN2018/083982
§ 371 (c)(1),
(2) Date: Nov. 8, 2018

(87) PCT Pub. No.: WO2019/029186
PCT Pub. Date: Feb. 14, 2019

(65) Prior Publication Data
US 2021/0055471 A1 Feb. 25, 2021

(30) Foreign Application Priority Data
Aug. 8, 2017 (CN) .......................... 201710671466.8

(51) Int. Cl.
*G02F 1/00* (2006.01)
*F21V 8/00* (2006.01)
*G02F 1/1333* (2006.01)

(52) U.S. Cl.
CPC ......... *G02B 6/0055* (2013.01); *G02B 6/0086* (2013.01); *G02F 1/133308* (2013.01); *G02F 1/133314* (2021.01)

(58) Field of Classification Search
CPC .. G02B 6/0073; G02B 6/0083; G02B 6/0086; G02B 6/0055; G02F 1/133603;
(Continued)

(56) References Cited

U.S. PATENT DOCUMENTS 8,421,971 B2   4/2013   Zhang et al.
8,698,973 B2   4/2014   Wei
(Continued)

FOREIGN PATENT DOCUMENTS

CN   102096218 A   6/2011
CN   102109689 A   6/2011
(Continued)

OTHER PUBLICATIONS

International Search Report and Written Opinion dated Jun. 27, 2018, from application No. PCT/CN2018/083982.

*Primary Examiner* — Y M. Quach Lee
(74) *Attorney, Agent, or Firm* — Arch & Lake LLP

(57) ABSTRACT

A backlight module includes a back plate including a back plate body and a first bending structure perpendicular to the back plate body. The backlight module includes a light source. On a side at which the light source is disposed, the back plate further includes a second bending structure connected to the first bending structure and extending in the same direction as the back plate body. The second bending structure includes a plurality of spaced protrusion portions,
(Continued)

and a depressed portion between the adjacent protrusion portions configured to accommodate a light emitting portion of the light source.

13 Claims, 7 Drawing Sheets

(58) Field of Classification Search
CPC ........ G02F 2001/133314; G02F 2001/133328; G02F 1/133308; G02F 1/13306
See application file for complete search history.

(56) References Cited

U.S. PATENT DOCUMENTS

| | | |
|---|---|---|
| 9,207,473 B2 | 12/2015 | Wei |
| 2012/0140139 A1 | 6/2012 | Zhang et al. |
| 2012/0169959 A1 | 7/2012 | Wei |
| 2014/0162523 A1 | 6/2014 | Wei |
| 2017/0184911 A1* | 6/2017 | Ochi ................. G02F 1/133308 |
| 2017/0199322 A1* | 7/2017 | Ochi .................... G02B 6/0055 |

FOREIGN PATENT DOCUMENTS

| | | |
|---|---|---|
| CN | 104965330 A | 10/2015 |
| CN | 205210477 U | 5/2016 |
| CN | 105733465 A | 7/2016 |
| CN | 205480513 U | 8/2016 |
| CN | 106444154 A | 2/2017 |
| CN | 107272262 A | 10/2017 |

\* cited by examiner

BACKLIGHT MODULE AND DISPLAY DEVICE

CROSS REFERENCE

The present application based on International Application No. PCT/CN2018/083982, filed on Apr. 20, 2018, which is based upon and claims priority to Chinese Patent Application No. 201710671466.8, entitled "Backlight Module and Display Device", filed on Aug. 8, 2017, the entire contents of which are hereby incorporated by reference.

TECHNICAL FIELD

The present disclosure relates to the field of display technology, and more particularly, to a backlight module and a display device.

BACKGROUND

With the rapid development of electronic technologies, people's requirements for electronic products are getting higher and higher. Taking a smart phone as an example, a narrow frame design of a screen of the phone can make the product more fashionable, and to a certain extent, can also increase a screen ratio of the screen, to make the picture wider, thus meeting consumers' increasing demand for display products.

In recent years, a frame size of a screen of a mobile phone can be reduced to 0.5 mm, which puts higher requirements on a narrow frame design of the backlight module. In order to implements the narrow frame design of the backlight module, the backlight module mainly adopts an iron-plastic integrated design, but this solution has the problem that a flatness of the back plate is not high.

It should be noted that the foregoing information disclosed in Background are only for the purpose of enhancement of the understanding of the background of the present disclosure and therefore the information can include information that does not constitute the related art already known to those of ordinary skill in the art.

SUMMARY

Other features and advantages of the present disclosure will be apparent from the following detailed descriptions, and may be partially learned by practice of the present disclosure.

According to an aspect of the present disclosure, there is provided a backlight module. The backlight module includes a back plate including a back plate body and a first bending structure perpendicular to the back plate body. The backlight module includes a light source. On a side at which the light source is disposed, the back plate further includes a second bending structure connected to the first bending structure and extending in the same direction as the back plate body. The second bending structure includes a plurality of spaced protrusion portions, and a depressed portion between the adjacent protrusion portions configured to accommodate a light emitting portion of the light source.

In an exemplary arrangement of the present disclosure, the light source is an LED light bar, and the LED light bar includes a flexible circuit board and an LED chip. The flexible circuit board is disposed on a side of the second bending structure facing away from the back plate body, and the light emitting portion is the LED chip.

In an exemplary arrangement of the present disclosure, the backlight module further includes a first light-shielding tape disposed on an opposite side of the light source. The backlight module further includes the first light-shielding tape includes a first strip-shaped body and a plurality of spaced protrusions extending from the first strip-shaped body. T he first strip-shaped body and the protrusions are perpendicular to each other.

In an exemplary arrangement of the present disclosure, the first bending structure of the back plate is provided with a corner open groove at a corner. T he first light-shielding tape further includes a lug located at both ends of the first strip-shaped body, and the lug is perpendicular to the first strip-shaped body and the protrusions. A depth and a width of the corner open groove are matching a height and a width of the lug.

In an exemplary arrangement of the present disclosure, the backlight module further includes a second light-shielding tape disposed on a side of the light source.

In an exemplary arrangement of the present disclosure, the second light-shielding tape includes a second strip-shaped body, a first bonding portion located at both ends of the second strip-shaped body, and a second bonding portion at a side edge of the second strip-shaped body. The second strip-shaped body is parallel to the back plate body, and the first bonding portion and the second bonding portion are perpendicular to each other and are both perpendicular to the back plate body.

In an exemplary arrangement of the present disclosure, the back plate is a metal backplane.

In an exemplary arrangement of the present disclosure, the backlight module further includes a light guide plate, a reflection sheet, and an optical film material. The light guide plate is disposed on a light exiting side of the light source, the reflection sheet is disposed between the light guide plate and the back plate, and the optical film material is disposed on a side of the light guide plate facing away from the back plate.

According to an aspect of the present disclosure, there is provided a display device including a cover plate, a display panel, and a backlight module described above.

In an exemplary arrangement of the present disclosure, except for the side at which the light source is disposed, bonding of side surfaces of the backlight module, the display panel and the cover plate are carried out by a hot melt adhesive.

It shall be understood that the above general description and the following detailed description are merely exemplary and explanatory and are not intended to be restrictive of the present disclosure.

BRIEF DESCRIPTION OF THE DRAWINGS

The accompanying drawings, which are incorporated in and constitute a part of this specification, illustrate arrangements consistent with the present disclosure and, together with the description, serve to explain the principles of the present disclosure. It will be obvious that the drawings in the following descriptions are some arrangements of the present disclosure only, and those ordinary skilled in the art may obtain other drawings form these drawings without paying any creative labor.

REFERENCE SIGNS

Figure 1:
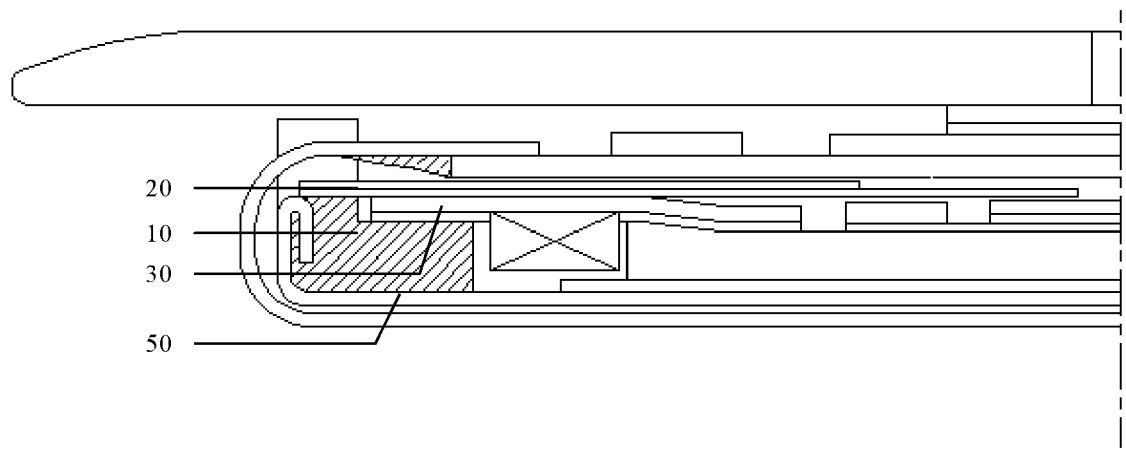
FIG. 1 is a schematic cross-sectional view illustratively showing a side of an LED of a backlight module in the related art.

10—plastic frame; 20—light-shielding tape; 201—first light-shielding tape; 2011—first strip-shaped body; 2012—protrusion; 2013—lug; 202—second light-shielding tape; 2021—second strip-shaped body; 2022—first bonding portion; 2023—second bonding portion; 30—LED light bar; 301—flexible circuit board; 302—LED chip; 40—optical film material; 50—back plate; 501—back plate body; 502—first bending structure; 503—second bending structure; 5031—protrusion portion; 5032—depressed portion; 60—light guide plate; 70—reflection sheet; 80—open groove; 90—suction cup.

DETAILED DESCRIPTION

The exemplary arrangements will now be described more fully with reference to the accompanying drawings. However, the exemplary arrangements can be implemented in various forms and should not be understood as being limited to the examples set forth herein; rather, these arrangements are provided so that this disclosure will be thorough and complete, and the conception of exemplary arrangements will be fully conveyed to those skilled in the art. The features, structures or characteristics described herein may be combined in one or more arrangements in any suitable manner. In the following description, numerous specific details are provided so as to allow a full understanding of the arrangements of the present disclosure. However, those skilled in the art will recognize that the technical solutions of the present disclosure may be practiced without one or more of the specific details, or other components, blocks and so on may be used. In other cases, the well-known technical solutions are not shown or described in detail to avoid obscuring various aspects of the present disclosure.

For ease of description, spatial relation terms such as "below", "under", "at the bottom", "above", "at the top" may be used herein to describe relations between one element or feature and another element or feature (or other elements or features) as shown in the figures. It will be understood that the spatial relation terms are intended to encompass different orientations of a device in use or operation in addition to an orientation shown in the figures. For example, if an apparatus in the figures is turned over, the element "below" or "under" the other elements or features is described as "above" the other elements or features. Thus, the exemplary term "under" can include both orientations of "above" and "under". Additionally, the apparatus may be positioned (rotated by 90 degrees or in other orientations) and the spatial relation descriptors used herein are interpreted accordingly.

In addition, the accompanying drawings are merely schematic illustrations of the present disclosure and are not necessarily drawn to scale. Thicknesses and shapes of the layers in the drawings do not reflect true scale and are provided merely for convenience of explaining the contents of the present disclosure. The same reference numerals in the drawings denote the same or similar parts, and the repeated descriptions thereof will be omitted.

Figure 2:
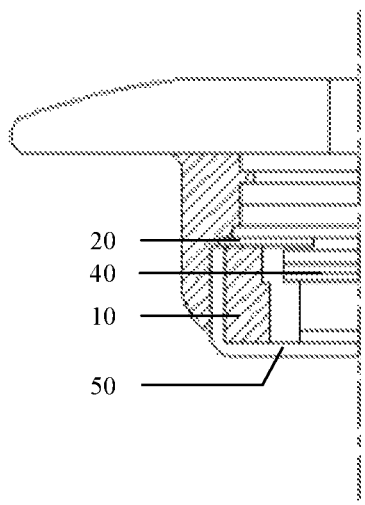
FIG. 2 is a schematic cross-sectional view illustratively showing an opposite side of an LED of a backlight module in the related art.
Figure 3:
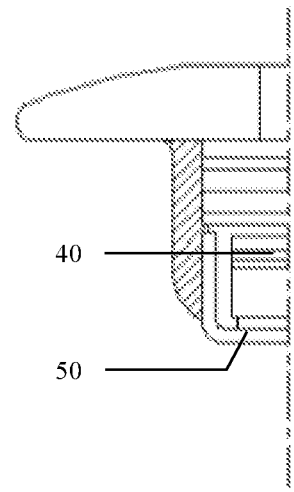
FIG. 3 is a schematic cross-sectional view illustratively showing left and right sides of a backlight module in the related art.

At present, for a screen frame of below 0.6 mm, an iron-plastic integrated design solution is mainly adopted for a backlight module. FIGS. 1 to 3 are partial design views of an iron-plastic integrated backlight module in the related art. As can be seen from the figures, a plastic frame 10 and a light-shielding tape 20 are provided on upper and lower sides of the backlight module. There are no plastic frame 10 and light-shielding tape 20 disposed on left and right sides of the backlight module. Providing the plastic frame 10 on the upper and lower sides, on one hand, ensures a lap width of the light-shielding tape 20, and on the other hand, is for containing a Light Emitting Diode (LED) light bar 30. Providing the light-shielding tape 20 on the upper and lower sides, on one hand, blocks an edge bright line of the optical film material 40, and on the other hand, fixes the optical film material 40 to prevent the optical film material from being shifted or peeled off upon backlight feeding, furthermore, it also guarantees that the backplane is not displaced due to the adhesion between the backplane 50 and a Flexible Printed Circuit on Glass (FOG), so as not to affect the gluing accuracy, when the backlight module is glued and bonded.

In a conventional iron-plastic integrated backlight module structure, however, after the back plate 50 is formed by injection molding, due to the shrinkage deformation in the molding of the plastic frame 10, the flatness of the back plate 50 is increased, so a planarization process is required in subsequent blocks to reduce its flatness.

Figure 4:
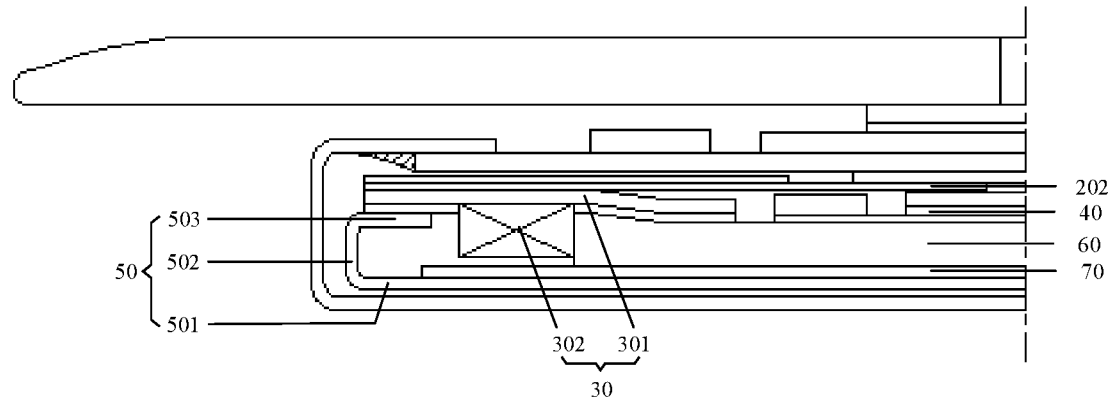
FIG. 4 is a schematic cross-sectional view illustratively showing a side of an LED of a backlight module in an exemplary arrangement of the present disclosure.
Figure 5:
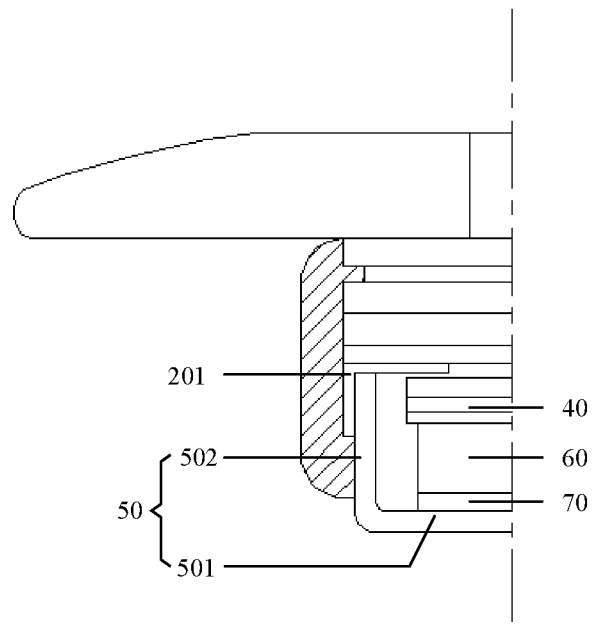
FIG. 5 is a schematic cross-sectional view illustratively showing an opposite side of an LED of a backlight module in an exemplary arrangement of the present disclosure.
Figure 6:
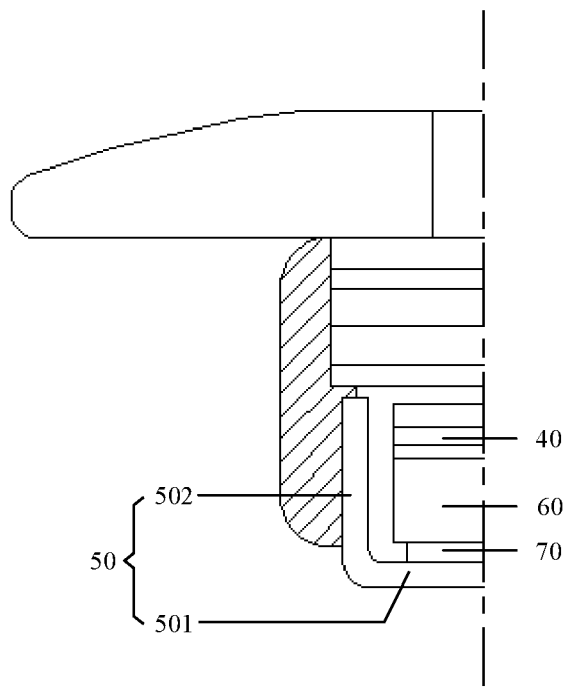
FIG. 6 is a schematic cross-sectional view illustratively showing left and right sides of a backlight module in an exemplary arrangement of the present disclosure.

In order to solve the problems in the related art, an exemplary arrangement of the present disclosure provides a backlight module having no plastic frame, configured to provide a backlight for a Liquid Crystal Display (LCD). As shown in FIGS. 4 to 6, the backlight module may include: a back plate 50; a light source such as an LED light bar 30 disposed on a side of the back plate 50; a light guide plate 60 disposed on a light exiting side of the light source; a reflection sheet 70 disposed between the back plate 50 and the light guide plate 60; and an optical film material 40 disposed on a side of the light guide plate 60 facing away from the back plate 50. The optical film material 40 may include upper and lower diffusion sheets and a prism sheet.

Referring to FIGS. 4 to 6, the back plate 50 may include a back plate body 501 and a first bending structure 502 perpendicular to the back plate body 501. On a side where the light source is disposed, the back plate 50 may further include a second bending structure 503 connected to the first bending structure 502 and extending in the same direction as the back plate body 501, and the second bending structure 503 and the back plate body 501 extending in the same direction means that the second bending structure 503 is disposed in parallel with the back plate 501. In this way, on the side where the light source is disposed, a cross-sectional shape of the back plate 50 is similar to a "U" shape, and the back plate body 501 is coupled to the second bending structure 503 via the first bending structure 502.

Figure 7:
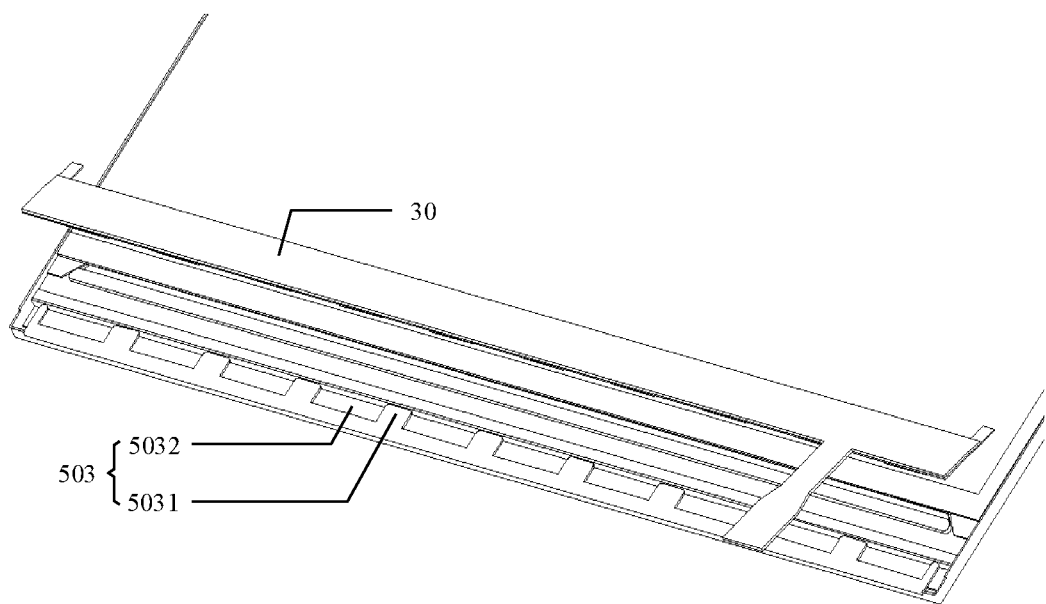
FIG. 7 is a schematic view illustratively showing a side of an LED of a backlight module in an exemplary arrangement of the present disclosure.
Figure 8:
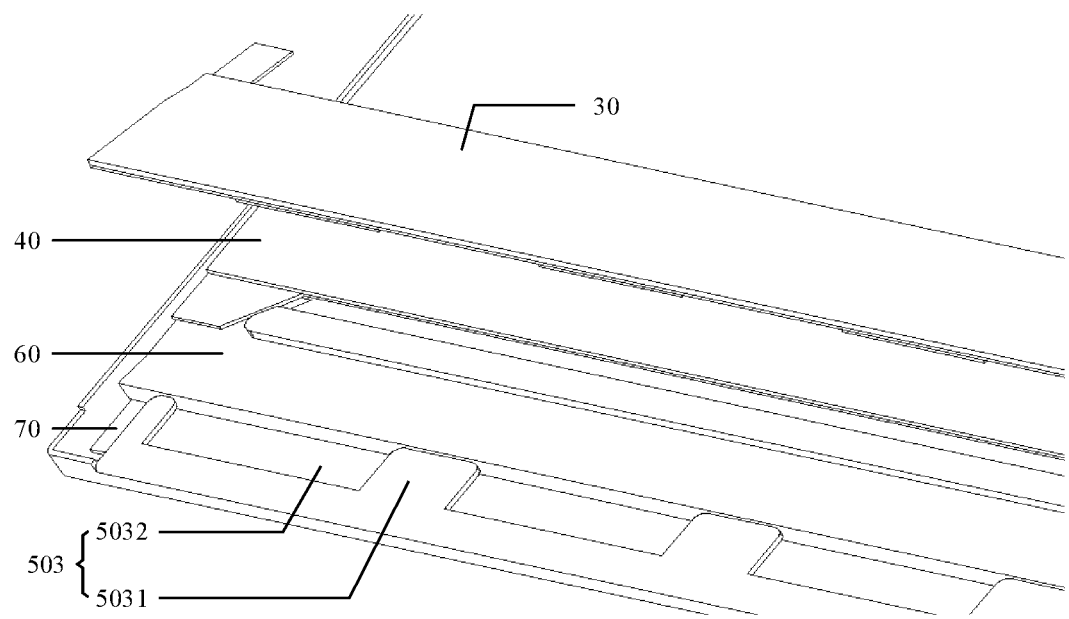
FIG. 8 is a perspective view schematically showing a side of an LED of a backlight module in an exemplary arrangement of the present disclosure.

As shown in FIGS. 7 and 8, the second bending structure 503 may include a plurality of protrusion portions 5031 spaced with each other, and a depressed portion 5032 between the adjacent protrusion portions 5031 may be used to accommodate a light emitting portion such as an LED chip of the light source. In this way, the second bending structure 503 of the back plate 50 may form "Great Wall-shaped" planar structure as illustrated in the drawing to facilitate the mounting of the light source and provide a space for placing the light emitting portion of the light source. In this arrangement, the "Great Wall-shaped" planar structure may be formed by bending the back plate 50 after it is punched.

It should be noted that the backlight module provided by this arrangement is a side-in type backlight module, that is, the light source is disposed on a side surface of the backlight module and faces a light incident surface of the light guide plate.

The backlight module provided by the exemplary arrangement of the present disclosure is a backlight module without a plastic frame, which improves the structure of the back plate 50 so that the arrangement of the light source is not affected. As compared with the backlight module in the related art, the design of the backlight module provided by the exemplary arrangement and having no plastic frame can not only further narrow a frame width of a display screen, but also simplify the process of forming the backlight module, thus improving the production efficiency. Meanwhile, since an injection molding process is not required for forming the structure of the backlight module, the production cost can be effectively saved. On this basis, since there is not provided a plastic frame, the shrinkage deformation of the back plate caused by the molding of the plastic frame does not occur, so the backlight structure can improve a flatness of the back plate 50. In terms of the current processes, the flatness of the back plate 50 in the present arrangement can reach ±0.2 mm, and the flatness of iron-plastic integrated back plate 50 of 0.1 mm mass produced in the related art is about ±0.3 mm.

In the present exemplary arrangement, referring to FIG. 4, the light source is an LED light bar 30. The LED light bar 30 may include a flexible circuit board 301 and a plurality of LED chips 302 on the flexible circuit board 301, and the LED chip 302 is the light emitting portion of the light source.

In an exemplary arrangement of the present disclosure, the back plate 50 may be a metal back plate, and the flexible circuit board 301 may be disposed on a side of the second bending structure 503 of the metal back plate facing away from the back plate body 501. That is, the flexible circuit board 301 of the LED light bar 30 is supported by the second bending structure 503 of the metal back plate 50.

In this way, the flexible circuit board 301 of the LED light bar 30 can be directly mounted on and in contact with the second bending structure 503 of the metal back plate 50. As compared to the LED light bar 30 fixed by means of a plastic frame, the LED light bar 30 direct contact with the back plate 50 is more beneficial for achieving the purpose of heat dissipation.

It should be noted that, in an exemplary arrangement of the present disclosure, an LED point light source is used in this arrangement because of specific advantages such as high brightness, low power consumption, long lifetime, and small possibility of generating visual fatigue. Other light sources such as Cold Cathode Fluorescent Lamp (CCFL), however, are not excluded, which is not specifically limited herein.

In the exemplary arrangement, referring to FIG. 4 and FIG. 5, the backlight module may further include a first light-shielding tape 201 disposed on an opposite side of the light source and a second light-shielding tape 202 disposed on one side of the light source. Disposing on the opposite side of the light source means that the first light-shielding tape 201 is located on an upper side of the backlight module, and is opposite to the LED light bar 30. Disposing on the one side of the light source means that the second light-shielding tape 202 is located on a lower side of the backlight module, and is on the same side as the LED light bar 30.

The first light-shielding tape 201 and the second light-shielding tape 202 can be used to block an edge bright line of the optical film material 40 and fix the optical film material 40.

No plastic frame is provided in various directions of the backlight module, but one of the roles of a plastic frame in a structure of a conventional backlight module is to provide a lap width for a light-shielding tape. Therefore, a structure of the light-shielding tape needs to be improved in this arrangement, so that a lap strength can be ensured with no plastic frame provided.

Figure 9:
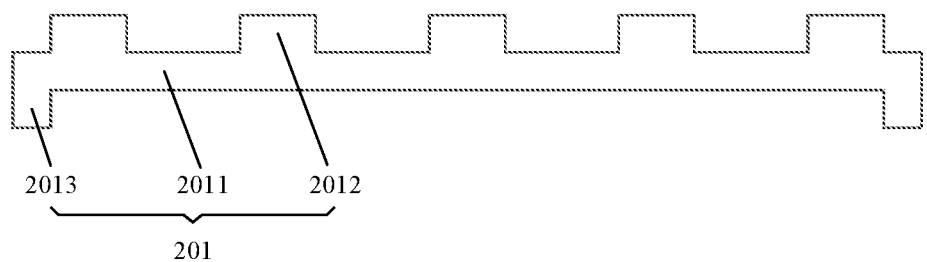
FIG. 9 is a schematic diagram schematically illustrating a two-dimensional structure of a light-shielding tape on an opposite side of an LED of a backlight module in an exemplary arrangement of the present disclosure.
Figure 10:
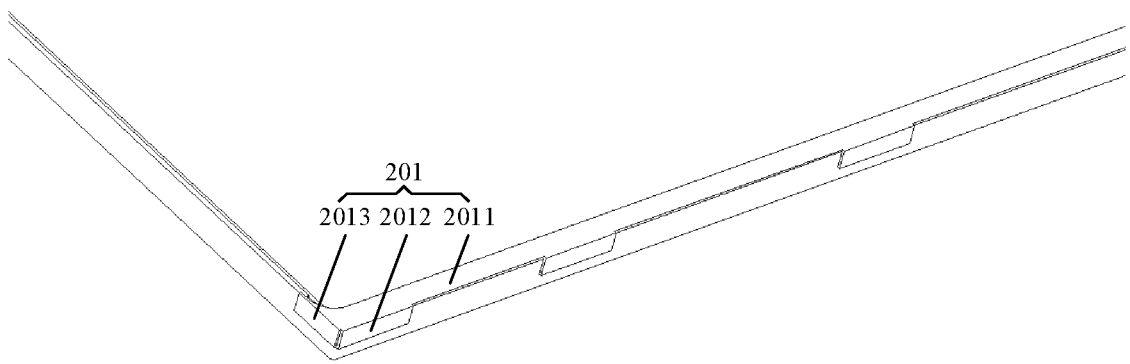
FIG. 10 is a schematic diagram schematically illustrating a light-shielding tape on an opposite side of an LED of a backlight module in an exemplary arrangement of the present disclosure.
Figure 11:
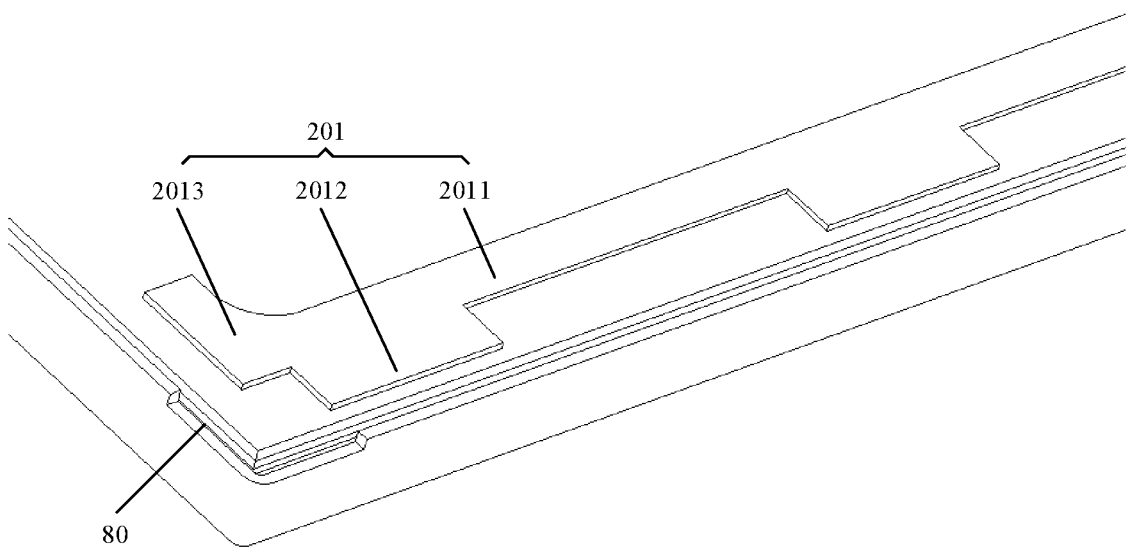
FIG. 11 is a detailed view schematically showing a light-shielding tape on an opposite side of an LED of a backlight module in an exemplary arrangement of the present disclosure.

Optionally, as shown in FIG. 9 to FIG. 11, the first light-shielding tape 201 may include a first strip-shaped body 2011 and a plurality of spaced protrusions 2012 extending from the first strip-shaped body 2011. FIG. 9 is a two-dimensional plan view showing the first light-shielding tape 201. Referring to FIG. 10, after assembly, the first strip-shaped body 2011 and the protrusions 2012 are perpendicular to each other.

Referring to FIG. 5, the first strip-shaped body 2011 may be mounted over the optical film material 40, and the protrusions 2012 may be mounted on a side edge of the back plate 50, that is, on an outer side of the first bending structure 502.

In this way, the arrangement of the protrusions 2012 can, on the one hand, guarantee the lap width of the first light-shielding tape 201, to prevent the optical film material 40 from being shifted or peeled off upon backlight feeding, and on the other hand, increase a bonding area of gluing on the side surface of the display module, to ensure a bonding strength when a hot melt adhesive is applied to bond the backlight module to a display panel and a glass cover-plate, and thus the risk of separation of reliability during subsequent testing process is prevented.

Further, the exemplary arrangement may fabricate the back plate 50 by use of a drawing process. In view of the feasibility of the preparation process, it is necessary to form a groove at a corner of the back plate 50 to ensure the drawing forming of the back plate 50. In general, the groove has a width of about 1 mm to 1.5 mm and a depth of about 0.2 mm or less. Forming the groove at the corner may result in a certain risk of adhesive entering the side surface of the display module in a subsequent gluing procedure.

Based on this, referring to FIG. 9 to FIG. 11, the first light-shielding tape 201 may further include a lug 2013 located at both ends of the first strip-shaped body 2011. After being assembles, the lug 2013, the first strip-shaped body 2011, and the protrusions 2012 are perpendicular to each other, individually.

The corner open groove 80 of the back plate 50 may be provided at a corner of the first bending structure 502 of the back plate 50, and a height and a width of the lug 2013 are matching a depth and a width of the corner open groove 80, that is, the lug 2013 can completely cover the open groove to avoid the risk of the flow-in of glue.

Figure 12:
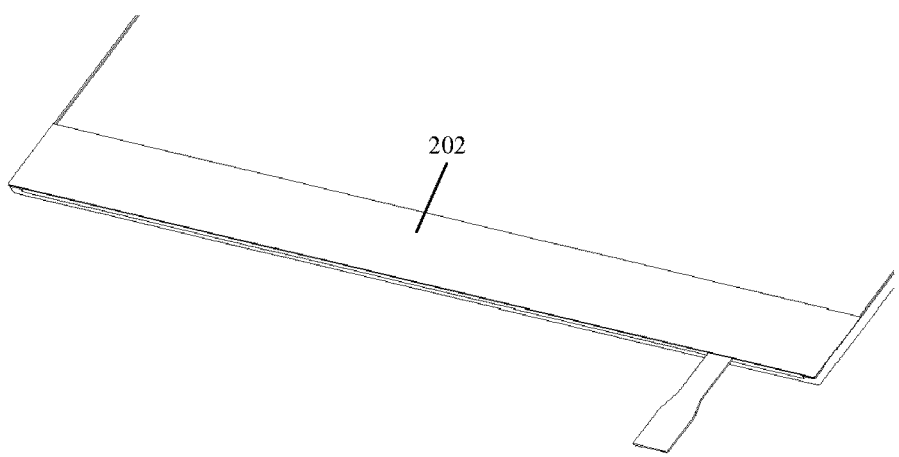
FIG. 12 is a schematic diagram schematically illustrating a light-shielding tape on a side of an LED of a backlight module in an exemplary arrangement of the present disclosure.
Figure 13:
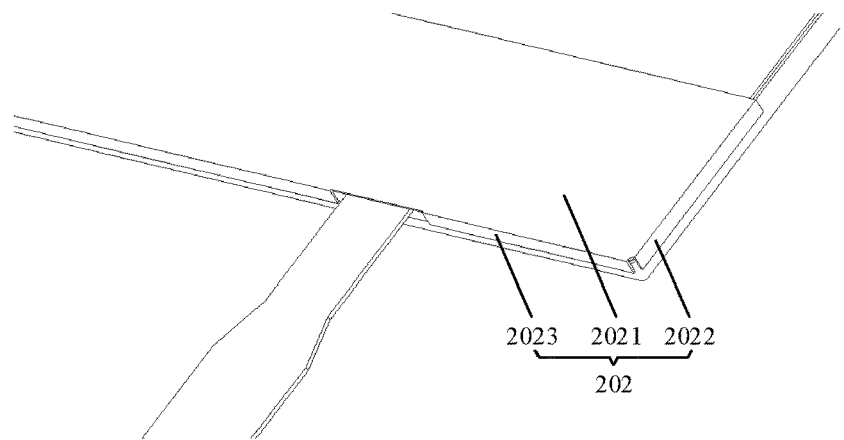
FIG. 13 is a schematic diagram schematically illustrating a light-shielding tape on a side of an LED of a backlight module in an exemplary arrangement of the present disclosure.
Figure 14:
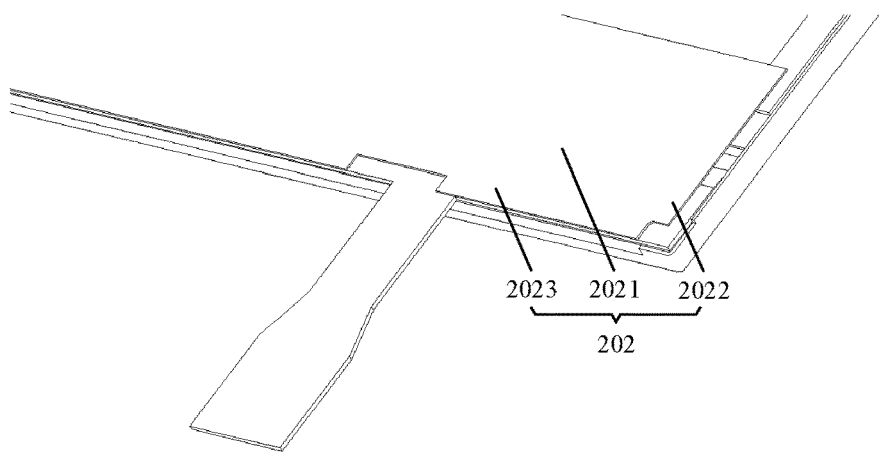
FIG. 14 is a detailed view schematically showing a light-shielding tape on a side of an LED of a backlight module in an exemplary arrangement of the present disclosure.

Optionally, as shown in FIG. 12, the second light-shielding tape 202 may be a strip-shaped planar structure that can be mounted on the optical film material 40 and the LED light bar 30 to prevent light leakage. When a spacing between adjacent LED chips is small, however, a width of the protrusion portions 5031 of the second bending structure 503 of the back plate 50 is relatively narrow, thus affecting the bonding strength of the LED light bar 30. Based on this, as shown in FIGS. 13 and 14, the second light-shielding tape 202 may include a second strip-shaped body 2021, a first bonding portion 2022 located at both ends of the second strip-shaped body 2021, and a second bonding portion 2023 located on a side edge of the second strip-shaped body 2021. The second strip-shaped body 2021 is parallel to the back plate body 501, and two of the first bonding portion 2022, the second bonding portion 2023, and the second strip-shaped body 2021 are perpendicular to each other.

In this way, the second light-shielding tape 202 can be mounted on the optical film material 40 and over the LED light bar 30, and on a side surface of the LED light bar 30, not only to prevent light leakage, but also increase the bonding strength of the LED light bar 30. A side bonding portion of the second light-shielding tape 202 can be in contact with the first bending structure 502 of the back plate 50, thus achieving the effect of enhancing a fixing strength of the LED light bar 30.

Figure 15:
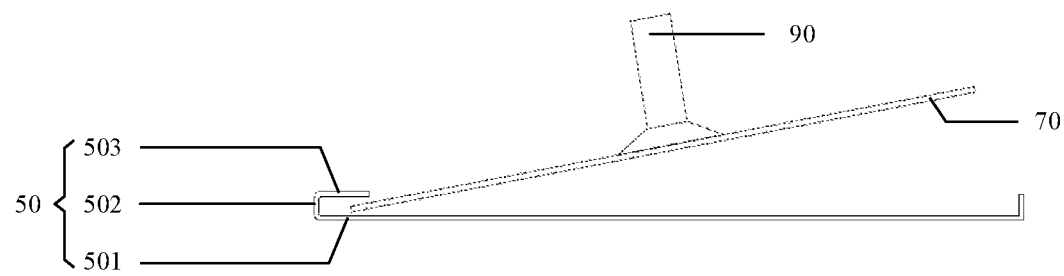
FIG. 15 is a schematic diagram schematically illustrating an assembly manner of a reflection sheet in an exemplary arrangement of the present disclosure.

Based on the structure of the backlight module described above, the reflection sheet 70 is placed on an inner side of the second bending structure 503 of the back plate 50. Therefore, the reflection sheet 70 of the structure cannot be assembled in a conventional vertical placement manner. In this case, as shown in FIG. 15, the reflection sheet 70 may be assembled in such a manner that the reflection sheet 70 is adsorbed by a vacuum suction cup 90, and the reflection sheet 70 is first obliquely placed within the second bending structure 503 of the back plate 50, and then the corner positioning of the optical film material 40 and the back plate 50 is recognized by using a Charge Coupled Device (CCD) image sensor.

It should be noted that the light guide plate 60 and other optical film materials 40 are assembled in the same manner as a conventional structure in this arrangement.

The exemplary arrangement further provides a display device including a cover plate, a display panel, and the backlight module described above. Except for the side on which the light source is disposed, bonding of side surfaces of the backlight module, the display panel and the cover plate may be carried out by hot melt adhesive.

The display device provided by the exemplary arrangement can further reduce the width of the display screen by using the backlight module having no plastic frame, and can also improve the production efficiency and reduce the manufacturing cost.

In the exemplary arrangement, the display device may include any product or component having a display function, such as a mobile phone, a tablet computer, a television, a notebook computer, a digital photo frame, a navigator, etc., which is not specifically limited in the present disclosure.

Other arrangements of the present disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and arrangements be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A backlight module comprising:
   a back plate comprising a back plate body and a first bending structure perpendicular to the back plate body; and
   a light source;
   wherein on a side at which the light source is disposed, the back plate further comprises a second bending structure connected to the first bending structure and extending in a same direction as the back plate body; and
   wherein the second bending structure comprises a plurality of spaced protrusion portions, a depressed portion between adjacent protrusion portions configured to accommodate a light emitting portion of the light source; and
   the backlight module further comprises a first light-shielding tape disposed on an opposite side of the light source; the first light-shielding tape comprises a first strip-shaped body and a plurality of spaced protrusions extending from the first strip-shaped body; and the first strip-shaped body and the protrusions are perpendicular to each other.

2. The backlight module according to claim 1, wherein the light source is an LED light bar, and the LED light bar comprises a flexible circuit board and an LED chip;
   the flexible circuit board is disposed on a side of the second bending structure facing away from the back plate body, and the light emitting portion is the LED chip.

3. The backlight module according to claim 1, wherein the first bending structure of the back plate is provided with a corner open groove at a corner;
the first light-shielding tape further comprises a lug located at both ends of the first strip-shaped body, and the lug is perpendicular to the first strip-shaped body and the protrusions;
wherein a depth and a width of the corner open groove are matching a height and a width of the lug.

4. The backlight module according to claim 1, further comprising:
a second light-shielding tape disposed on a side of the light source.

5. The backlight module according to claim 4, wherein the second light-shielding tape comprises a second strip-shaped body, a first bonding portion located at both ends of the second strip-shaped body, and a second bonding portion at a side edge of the second strip-shaped body;
the second strip-shaped body is parallel to the back plate body, and the first bonding portion and the second bonding portion are perpendicular to each other and are both perpendicular to the back plate body.

6. The backlight module according to claim 1, wherein the back plate is a metal back plate.

7. The backlight module according to claim 1, further comprising:
a light guide plate, a reflection sheet, and an optical film material;
wherein the light guide plate is disposed on a light exiting side of the light source, the reflection sheet is disposed between the light guide plate and the back plate, and the optical film material is disposed on a side of the light guide plate facing away from the back plate.

8. A display device comprising a cover plate, a display panel, and a backlight module according to claim 1.

9. The display device according to claim 8, wherein except for the side at which the light source is disposed, bonding of side surfaces of the backlight module, the display panel and the cover plate are carried out by a hot melt adhesive.

10. The backlight module according to claim 2, wherein the back plate is a metal back plate.

11. The backlight module according to claim 2, further comprising:
a light guide plate, a reflection sheet, and an optical film material;
wherein the light guide plate is disposed on a light exiting side of the light source, the reflection sheet is disposed between the light guide plate and the back plate, and the optical film material is disposed on a side of the light guide plate facing away from the back plate.

12. The backlight module according to claim 3, further comprising:
a light guide plate, a reflection sheet, and an optical film material;
wherein the light guide plate is disposed on a light exiting side of the light source, the reflection sheet is disposed between the light guide plate and the back plate, and the optical film material is disposed on a side of the light guide plate facing away from the back plate.

13. The display device according to claim 8, wherein the light source is an LED light bar, and the LED light bar comprises a flexible circuit board and an LED chip;
the flexible circuit board is disposed on a side of the second bending structure facing away from the back plate body, and the light emitting portion is the LED chip.

* * * * *